P. BARDON.
Water-Tank.
No. 211,647. Patented Jan. 28, 1879.
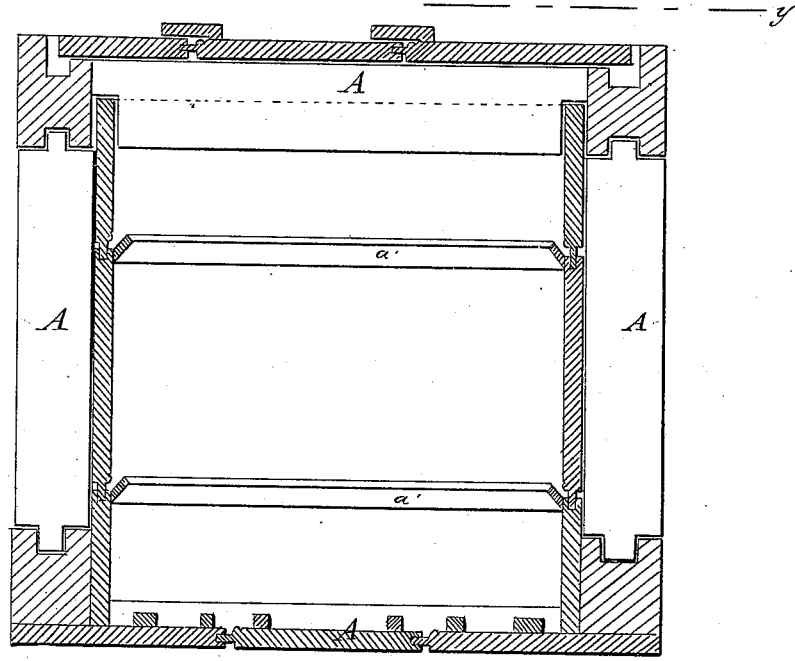
Fig. 1.
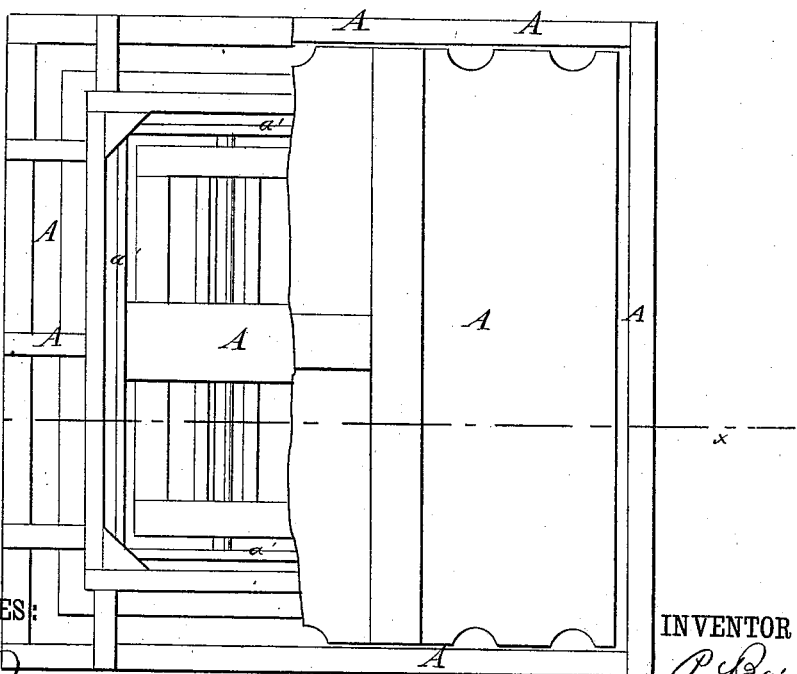
Fig. 2.
Fig. 3.
WITNESSES:
Chas. Nieta
C. Sedgwick
INVENTOR:
P. Bardon
BY Munn & Co
ATTORNEYS.

UNITED STATES PATENT OFFICE.

PROSPER BARDON, OF GALVESTON, TEXAS.

IMPROVEMENT IN WATER-TANKS.

Specification forming part of Letters Patent No. 211,647, dated January 28, 1879; application filed May 22, 1878.

*To all whom it may concern:*

Be it known that I, PROSPER BARDON, of Galveston, in the county of Galveston and State of Texas, have invented a new and useful Improvement in Water-Tanks, of which the following is a specification:

Figure 1 is a vertical section of a water-tank built in accordance with my invention. Fig. 2 is a top view of the same, part of the cover being removed, through the line $y\ y$, Fig. 1.

Similar letters of reference indicate corresponding parts.

The object of this invention is to furnish improved tanks for holding water, which shall be so constructed that water cannot pass through them, and which at the same time shall be strong and durable and not liable to get out of order, or to allow impurities from the soil the contaminate the water.

The invention will first be described in connection with the drawings, and then pointed out in the claim.

A represents a water-tank, which in the drawings is represented as being made square, but which may be made round or of any other desired shape.

The lumber, A, of which the tank is formed is thoroughly dried in kilns, drying-houses, or otherwise, and is then immersed in a bath of very hot melted mineral pitch or asphaltum, either natural or artificial, and is then built into a tank, each piece of timber being thus coated with asphaltum upon all sides before being built into the tank.

After the tank has been built it is coated inside and out with asphaltum, so that it will be impossible for water or moisture to find access to the wood either from the outside or inside of the tank.

The seams between the pieces of lumber are secured with an additional amount of asphaltum, which is placed in grooves formed along the edges of said seams, when convenient to form such grooves, in the timber itself.

Upon the sides of the tank, and in other parts, grooves are formed along the seams by attaching cleats $a'$ to the timbers in inclined positions, as shown in Fig. 1, into which grooves melted asphaltum is then poured, so as to wholly fill them.

With this construction the cisterns or tanks may be built of inferior lumber, the lumber not being intended to prevent the passage of water, but simply to support and confine the water, the passage of the water being prevented by the asphaltum. Tanks thus formed may be placed below the surface of the ground, upon the surface of the ground, or above it, as may be desired.

When placed upon or above the surface of the ground the tanks may be weatherboarded, so as to present a neat and ornamental appearance.

The tanks are designed to be provided with inlet and ventilating pipes, and with pumps for removing the water, or openings to allow the water to be removed with buckets, as may be desired.

Having thus described my invention, I claim as new and desire to secure by Letters Patent—

A water-tank formed of wood, with cleated seams and corner-strips, the whole asphalted, as and for the purpose specified.

P. BARDON.

Witnesses:
 JNO. S. KEAGHEY,
 J. WIETING.